March 13, 1934.  C. E. SWENSON  1,950,579
UNIVERSAL JOINT
Filed May 28, 1931  2 Sheets-Sheet 1
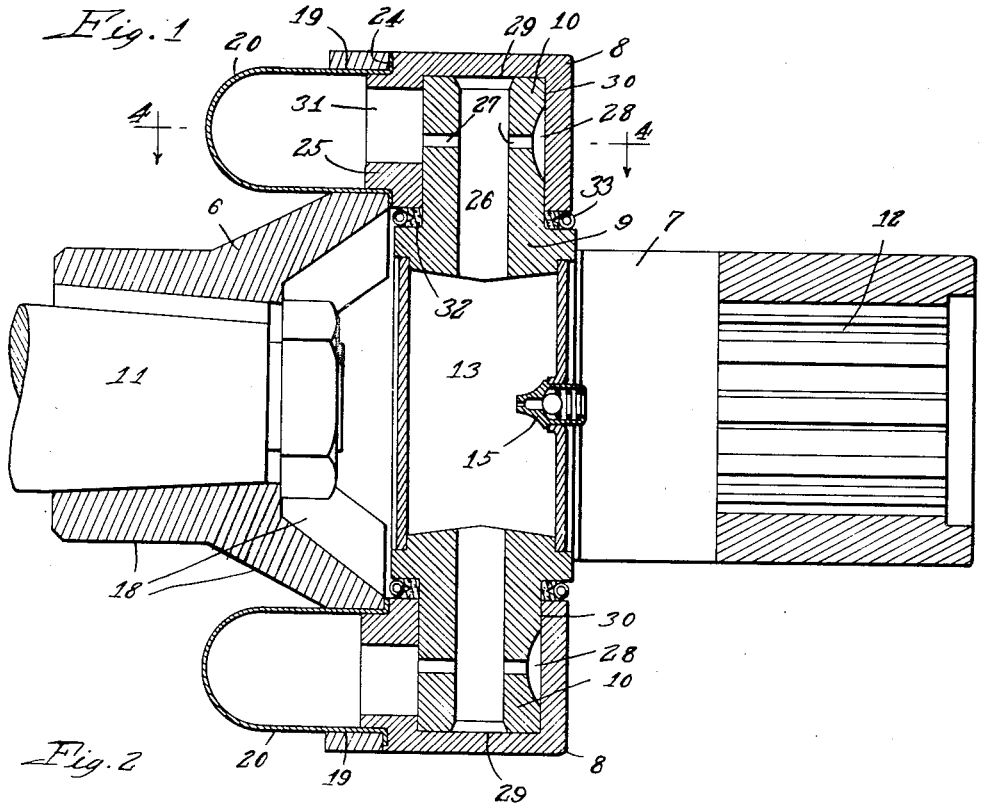
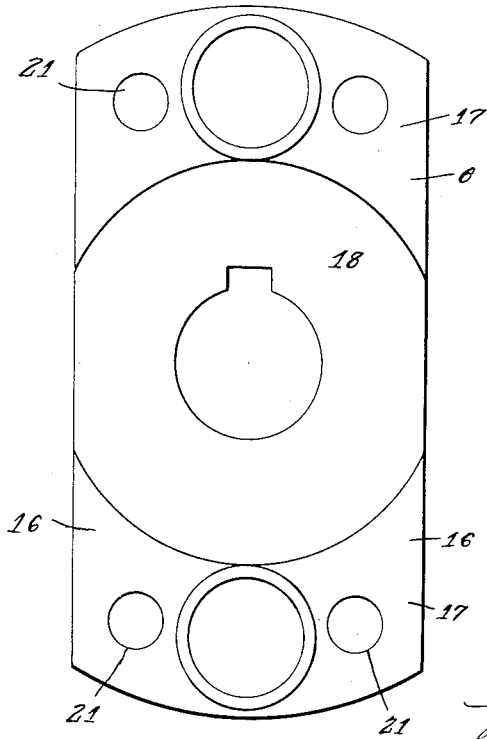
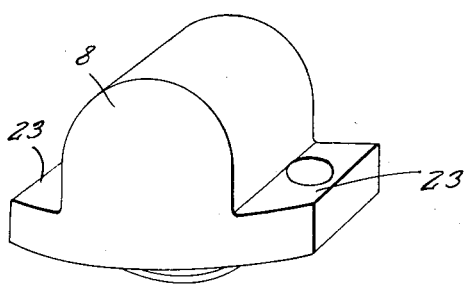
Inventor
By Carl E. Swenson
Wilson, Dowell, McCanna & Rehm
Attys.

March 13, 1934.  C. E. SWENSON  1,950,579
UNIVERSAL JOINT
Filed May 28, 1931  2 Sheets-Sheet 2

Patented Mar. 13, 1934

1,950,579

UNITED STATES PATENT OFFICE 1,950,579

UNIVERSAL JOINT

Carl E. Swenson, Rockford, Ill., assignor to Mechanics Universal Joint Company, Rockford, Ill., a corporation of Illinois Application May 28, 1931, Serial No. 540,533

7 Claims. (Cl. 64—102)

This invention relates to universal joints of the trunnion type particularly adapted for use in motor vehicles in the driving train thereof.

In universal joints of this type it is customary to arrange the trunnions on an intermediate member which serves as a lubricant reservoir and to provide a packing at the inner end or base of each trunnion bearing, the trunnion fitting in bearings suitably carried by the yokes or terminal coupling members which connect to the driving and driven members. Lubricant from the central reservoir is delivered through suitable passages to the trunnion bearing surfaces and, with this arrangement, the lubricant exerts a pressure against the packings due to the centrifugal force during operation, this pressure continues substantially throughout the life of the lubricant supply and frequently causes leakage through the packings and loss of lubricant, with the result that the joint will "freeze" long before the estimated life of the oil supply. This condition is remedied by my present invention.

One object is to provide means for preventing loss of lubricant in a joint of the character described, thereby insuring a supply of lubricant over a long period of time. This is accomplished by the provision of an individual reserve lubricant reservoir for each trunnion bearing arranged in a novel manner and adapted to well serve the purpose intended.

Another object of the invention is to produce a balanced joint, and by this I mean, a structure having substantially uniform dynamic balance so that the joint will run true and without vibration.

Still another object is to provide a joint having the characteristics described which may be economically produced and at the same time will be strong and durable for the purposes intended.

Other objects will be appreciated by those skilled in the art as the invention becomes better understood by reference to the following description when considered in connection with the accompanying drawings, in which—

Figure 1 is a longitudinal section through a universal joint embodying my invention;

Fig. 2 is a face view of one of the yokes equipped with reserve lubricant reservoirs;

Fig. 3 is a perspective view of one of the trunnion bearings;

Figure 4:
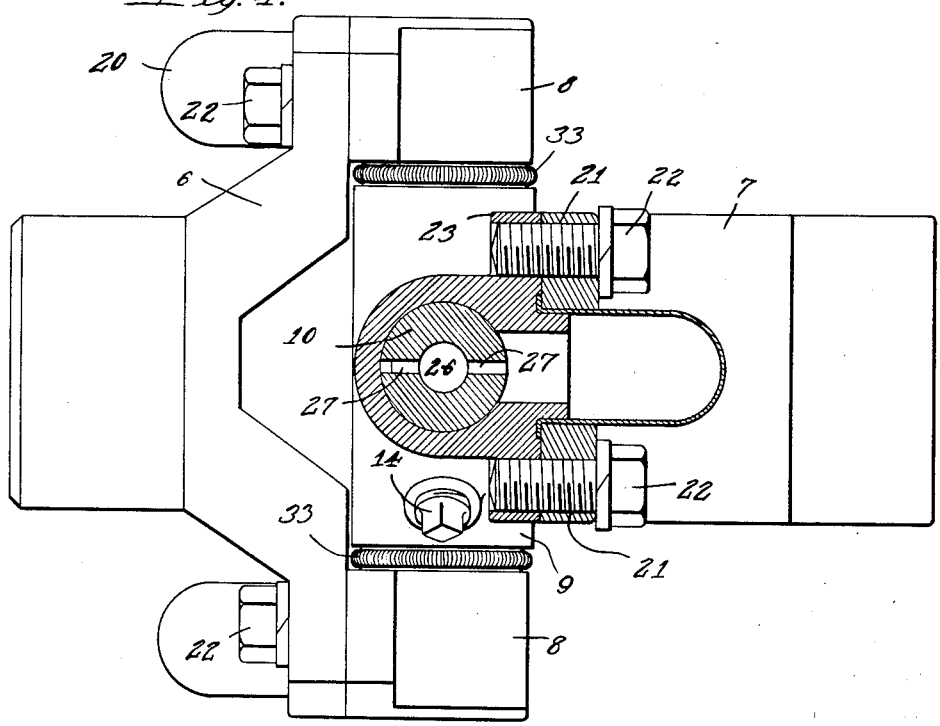
Fig. 4 is a plan view of the joint as shown in Fig. 1 as taken on the section line 4—4 thereof.
Figure 5:
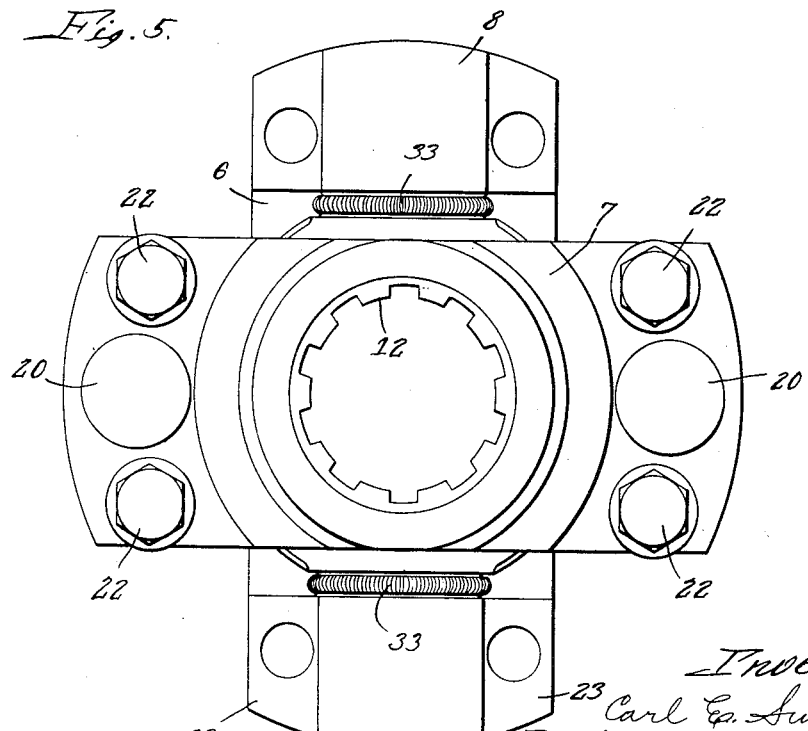
Fig. 5 is an end view of the joint, looking at the right-hand end of Fig. 1.

I have designed the joint shown in the drawings for use in the propeller train of a motor vehicle, and my invention is particularly well suited, though not limited, to this purpose.

Briefly stated, the joint consists of a pair of terminal coupling members or yokes 6 and 7 each equipped with a pair of bearing blocks 8, and an intermediate member 9 equipped with trunnions 10 fitting in the bearing blocks. The members 6 and 7 are suitably connected to driving and driven members, in this instance the member 6 being fixedly clamped to the tapered end of a drive shaft 11 and the member 7 being splined at 12 for connection to a propeller shaft not shown. The intermediate member 9 and the trunnions 10 constitute a cross member with the result that a joint of this kind is commonly referred to as of the cross type.

In the joint shown, the intermediate member 9 serves to provide a central, main lubricant reservoir 13 the sides of which are suitably closed. Lubricant, preferably of oil consistency, is supplied to this reservoir through a suitable filling opening, normally closed by a plug 14, shown in Fig. 4. A relief outlet 15, Fig. 1, is provided, as is customary.

Each yoke is preferably machine finished on all surfaces so as to have a true dynamic balance. In the preferred embodiment of this phase of my invention the sides 16 are finished parallel by straddle milling cutters, the faces 17 are finished coplanar by a surface milling operation and the faces 18 are finished by turning operations. Each arm of each yoke is bored at 19 for the reception of a reserve lubricant reservoir 20 and is further bored at 21 for the reception of bolts 22 which screw into wings 23 of the bearing blocks and serve to clamp the latter to the yokes. Each reservoir 20 is drawn from sheet metal into the tubular or thimble form shown and has an annular flange 24 at its open end. The tubular reservoirs are inserted into the bores 19 from the face of each yoke and have a press fit when inserted to the position shown. Each bearing block seats against a face 17 of one of the yoke arms and has a locating boss 25 fitting into the interior of the adjacent reservoir tube, as shown in Figs. 1 and 4. The bolts 22 pass through the holes 21 in the arms 16 and are threaded into the holes in the wings 23 of the bearing blocks and, when tightened, clamp the bearing blocks to the yokes, thereby locking the reservoir tubes against displacement. This construction also provides an oil-tight connection between the bearing blocks and the reservoir tubes.

Lubricant from the main reservoir 13 is supplied to the trunnion bearing surfaces through a central passage 26 in each trunnion and lateral passages 27. Suitable longitudinal oil grooves 28 emanate from the passages 27. Thus, lubricant is supplied to the surfaces 29 which take the end thrust of the trunnions and also to the cylindrical bearings 30 which take the radial thrust of the trunnions. A passage 31 in each bearing block provides communication between the cylindrical bearing 30 and the adjacent reservoir tube.

Loss of lubricant from the trunnion bearings is prevented by packings at the inner end or base of the trunnions. These packings may be of any suitable or preferred construction, that shown being claimed in my application Serial No. 567,920 and consisting, briefly stated, of a leather ring 32 having a V-shaped groove in its periphery and a helical spring 33 located in the groove. The contractile spring serves to urge the sides of the packing ring into sealing contact with the adjacent walls.

When supplying lubricant to the universal joint the entire interior is filled, including the reserve reservoirs, the relief 15 permitting escape of air and also indicating by escape of lubricant when the capacity has been reached. Should any passage or reserve reservoir or portion thereof have become air bound when filling the joint, the lubricant will soon work out and fill up these spaces as soon as the joint is put into operation.

It will be observed that the reserve lubricant reservoirs are arranged at the outer side of the trunnion packings so that the centrifugal force of the lubricant therein does not affect the packings. Thus a comparatively large quantity of lubricant contained in these reserve reservoirs will be maintained against loss incidental to packing leakage over a comparatively long period of time. Furthermore, these reserve reservoirs are located approximately within the radial over-all dimension of the trunnions, with the result that the radial dimension or diameter of the joint is kept at a minimum.

It should also be observed that the design affords comparatively large trunnions and bearing surfaces therefor and a strong and durable means of attaching the bearing blocks to the yoke members. Still another advantage of the design is that the parts may be economically manufactured and assembled and the resulting structure will possess a high degree of balance.

It should be understood that in the commercial manufacture of universal joints embodying my invention, changes may be made in details of construction without departing from the spirit and scope of the invention as expressed in the appended claims, in which—

I claim:

1. A universal joint of the trunnion type having a yoke member the arms of which have coplanar faces parallel with the trunnion axes, each arm having a bore at right angles to said trunnion axes, and a lubricant reservoir for each trunnion consisting of a tubular body pressed from sheet metal so as to be closed at one end and open at the other and being inserted into one of said bores and retained therein, a bearing block for each trunnion seating on one of said faces of the yoke arm and having a locating boss adapted to enter the open end of the tubular body of said reservoir, the block having a lubricant passage provided therein extending through said boss and providing communication between the adjacent trunnion bearing and the lubricant reservoir, and means for clamping the block in the position stated.

2. A universal joint comprising terminal yoke members each having radially projecting arms, the sides of which are finished in parallel relation and the faces of which are finished in coplanar relation, each arm having a bore for reception of a reserve lubricant reservoir, an elongated reserve lubricant reservoir fitting in each bore, a bearing block for each trunnion seated against the face of each arm and having a projecting boss entered in the bore for a torque transmitting connection between the block and yoke, said projection also having a passage provided therein for establishing communication between the trunnion bearing in the block and the reservoir, and means for clamping the bearing blocks to the arms.

3. In a universal joint comprising yoke members, an intermediate member having trunnions, and bearing blocks for said trunnions having flat faces arranged for abutment with flat faces provided on the yoke members where the blocks are arranged to be secured to said yoke members, a thimble to serve as a lubricant reservoir for each trunnion, each thimble being entered through a hole provided in a yoke member so that the closed end of the thimble projects from the back of the yoke member, the thimble having an annular outwardly projecting flange on its open end to seat on the yoke member around the hole, each bearing block having a projecting portion on the back thereof adapted to fit in the open end of a thimble to afford a torque transmitting driving connection between the block and yoke, there being a lubricant passage provided in the bearing block through said portion for further establishing communication between the thimble and the trunnion bearing recess provided in the block, and means to clamp the flat face of each block to the flat face on the yoke member associated therewith, one of the said faces being provided with a counterbore to accommodate the flange of the thimble, whereby to permit positive engagement of the flat faces.

4. A universal joint comprising driving and driven members, bearings detachably secured to said members, a spider having trunnions journaled in said bearings, and an individual lubricant container for each bearing separate from the bearing, said containers being individually supported on the driving and driven members independently of but alongside the bearings, the bearings having tubular portions to interfit detachably with portions of said containers when the bearings are secured to the driving and driven members whereby to place the bearings in communication with the containers, the construction set forth permitting removal of said bearings from the driving and driven members without disturbing said containers.

5. A universal joint comprising driving and driven members, bearings arranged to be detachably secured sidewise to said members, a spider having trunnions journaled in said bearings, and an individual lubricant container for each bearing separate from the bearing, said containers being individually supported on the driving and driven members independently of but alongside said bearings, the bearing having tubular portions constructed for detachable sealing engagement with portions of said containers when the bearings are secured to the driving and driven members, the construction set forth permitting removal of the bearings without disturbing the containers.

6. A universal joint comprising driving and driven members, bearings arranged to be detachably secured sidewise to said members, a spider having trunnions journaled in said bearings, an individual lubricant container for each bearing, said containers being mounted on the driving and driven members so as to form compression joints with lubricant conducting portions on the sides of said bearings when the bearings are placed in operative position on the driving and driven members, the compression joints providing the sole communication between the containers and the bearings, and means for detachably securing the bearings to the driving and driven members and simultaneously tightening the compression joints.

7. A universal joint comprising driving and driven members provided with bearings, a spider having trunnions journaled in said bearings, said bearings being separable from the driving and driven members and each having a projecting boss for reception in a hole in the driving or driven member to provide a torque transmitting driving connection, there being means for fastening the bearings to the driving and driven members independently of the projecting boss, and an individual lubricant retainer surrounding the projecting boss on each bearing and communicating with the trunnion in the bearing through said boss.

CARL E. SWENSON.